US 6,731,095 B2

(12) United States Patent
Satake et al.

(10) Patent No.: US 6,731,095 B2
(45) Date of Patent: May 4, 2004

(54) CONTROLLER FOR MULTIPLEX WINDING MOTOR

(75) Inventors: Akira Satake, Tokyo (JP); Shigeki Mizuno, Tokyo (JP); Hiroshi Araki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/162,588

(22) Filed: Jun. 6, 2002

(65) Prior Publication Data
US 2003/0085683 A1 May 8, 2003

(30) Foreign Application Priority Data
Nov. 6, 2001 (JP) ........................... 2001-341135

(51) Int. Cl.[7] ................................. H02P 5/28
(52) U.S. Cl. ................. 318/812; 318/808; 318/809; 318/810; 318/807; 318/798
(58) Field of Search ................. 318/812, 808, 318/809, 810, 807, 798, 590, 596

(56) References Cited
U.S. PATENT DOCUMENTS
5,390,102 A   2/1995  Araki
6,107,774 A * 8/2000  Yamada et al. ............. 318/807

FOREIGN PATENT DOCUMENTS
| JP | 3-253293 | 11/1991 |
| JP | 4-325893 | 11/1992 |
| JP | 5-260792 | 10/1993 |
| JP | 10-265140 | 10/1998 |

* cited by examiner

Primary Examiner—Rita Leykin
(74) Attorney, Agent, or Firm—Leydig, Voit & Mayer, Ltd.

(57) ABSTRACT

A controller for a multiplex winding motor. When a multiplex winding motor is driven and controlled by inverters and each winding includes a current control system, the controller compensates interference between the current control systems of windings. Voltage non-interacting arithmetic sections compute a voltage command value supplied to voltage applying sections, which are connected to a set of windings, not only by using an output value of a current control section for controlling current in one winding but also using an output value of a current control section for controlling current in another winding, so that voltage interference between the current control sections is compensated.

6 Claims, 6 Drawing Sheets

US 6,731,095 B2

1

CONTROLLER FOR MULTIPLEX WINDING MOTOR

This application is based on Application No. 2001-341135, filed in Japan on Nov. 6, 2001, the contents of which are hereby incorporated by reference.

BACKGROUND OF THE INVENTION

1. Field of the Invention

The present invention relates to a controller for a multiplex winding motor, in which the multiplex winding motor, having a plurality of independent windings in a single motor, is driven by a plurality of inverters to control rotation at variable speeds.

2. Description of the Related Art

When an alternating-current motor is driven at variable speeds, generally, an alternating-current motor having a set of multiphase (three phases in general) windings is driven by a single alternating-current power converter (inverter). FIG. 6 shows the configuration of a current controller for an induction motor according to the above method.

In FIG. 6, in a main circuit, a single voltage applying means 15 is connected to an induction motor 3 including a single set of windings, and a current detector 4 for detecting the output current in the voltage applying means 15 is provided on the output side of the voltage applying means 15. The voltage applying means 15 is composed of a PWM pulse generation circuit 5, which outputs a PWM (Pulse Width Modulation) pulse conforming to a direct-current power supply 1 and an alternating voltage command signal v*, and a drive circuit 2 for outputting a voltage of the direct-current power supply 1 in response to a PWM pulse signal produced by the PWM pulse generation circuit 5. The voltage applying means 15 supplies power to the induction motor 3.

Current controlling means 6 is constituted by a two-phase sine wave generation circuit 7, which uses a primary frequency command for an induction motor as input, uses a rotor speed of ω1* for a synchronous motor as input, and outputs a two-phase sine wave reference (phase) signal, a voltage command coordinate converter 8 for performing coordinate conversion from d-q axis component voltage commands Vd* and Vq* of a rotating coordinate system to a three-phase alternating voltage command signal v* of a stator coordinate system, a current component detecting coordinate converter 9 for performing coordinate conversion from each winding alternating current i to d-q axis component currents Id and Iq, and a current controller 11 which uses the component current commands $I_d^*$ and $I_q^*$ as commands and uses the d-q axis component currents Id and Iq as input. The d-q axis component currents Id and Iq are the output of the current component detecting coordinate converter 9.

In the above current controller, a current control system is constituted, in which commands of current magnitude and phase are supplied as an exciting component current command Id*, a torque component current command Iq*, and a primary frequency command ω1*, an alternating voltage command signal v* required for each winding of the motor is computed and outputted, current i is applied to the induction motor 3 via the voltage applying means 15, and a detected value i from the current detector 4 is used as a feedback value. An inverter 14 is constituted by the current control means 6, the voltage applying means 15, and the current detector 4.

Meanwhile, when a device for driving a large-capacity alternating-current motor does not have an inverter with a capacity suitable for the capacity of the motor, a multiplex winding alternating-current motor having a plurality of sets of multiphase windings may be driven by a plurality of inverters. According to this method, an inverter having the unit capacity of FIG. 6 can be combined according to the capacity without developing a new large-capacity inverter for large motors having different capacities. Thus, development and manufacturing of inverters can be more efficient, thereby reducing the cost. However, in this method, when current flowing in the sets of windings is unbalanced, an inverter with a larger capacity is necessary as compared with balanced current, or torque ripple and so on occurs. Hence, proposals have been made for applying constant current to sets of windings.

For example, FIG. 7 shows a current controller for a multiplex winding motor disclosed in Japanese Patent Laid-Open No. 5-260792. In FIG. 7, a main circuit has two voltage applying means 15A and 15B connected in parallel with a multiplex winding motor 3 having two sets A and B of windings. Drive circuits 2A and 2B, current detectors 4A and 4B, and PWM pulse generation circuits 5A and 5B have the same functions as those of FIG. 6.

A multiple current control means 6 is constituted by a two-phase sine wave generation circuit 7, which uses a primary frequency command for an induction motor as input, uses a rotor speed of ω1* for a synchronous motor as input, and outputs a two-phase sine wave reference (phase) signal, voltage command coordinate converters 8A and 8B for performing coordinate conversion from d-q axis component voltage commands $V_{da}^*$, $V_{qa}^*$, $V_{db}^*$, and $V_{qb}^*$ of a rotating coordinate system to three-phase alternating voltage command signals $v_a^*$ and $v_b^*$ of a stator coordinate system, current component detecting coordinate converters 9A and 9B for performing coordinate conversion from winding alternating currents $i_a$ and $i_b$ to d-q axis component currents $I_{da}$, $I_{qa}$, $I_{db}$, and $I_{qb}$, an average current detecting circuit 10 for computing an average value of d-q axis component currents of windings, an average current controller 11 which uses component current commands $I_d^*$ and $I_q^*$ as commands and inputs a deviation of average currents $I_d$ bar and $I_q$ bar, the average currents $I_d$ bar and $I_q$ bar being outputs of the average current detecting circuit 10, a current unbalance compensating circuits 12A and 12B for inputting a deviation of the average currents $I_d$ bar and $I_q$ bar and d-q axis component current in windings to correct unbalanced current in windings, and adders 13A and 13B.

When unbalance is not found on output voltage between the drive circuits, the output of the current unbalance compensating circuits 12A and 12B is 0, so that output voltage is equal between the drive circuits. Meanwhile, when unbalance occurs on the output voltage between the drive circuits, unbalance occurs on the current in windings, resulting in a difference among d-q axis component currents $I_{da}$, $I_{qa}$, $I_{db}$, and $I_{qb}$. According to a deviation from an average value of the currents, the current unbalance compensating circuits 12A and 12B output a signal for correcting d-q axis component voltage commands of windings such that a difference in d-q axis component currents of windings is 0. Three-phase alternating current command signals $v_a^*$ and $v_b^*$ obtained by adding the above signals are outputted from the voltage command coordinate converters 8A and 8B. Thus, control is performed such that windings have equal current values.

As described above, in the controller for the conventional multiplex winding motor, a plurality of voltage applying means is controlled by a single of multiple current control means. Thus, as compared with a unit capacity inverter for a single winding that is shown in FIG. 6, a current control system requires a large change in configuration, and it is difficult to share the use of the current control system with a unit capacity inverter which is used independently. Hence, it has not been possible to make full use of a merit of a unit capacity inverter.

As a method for solving the above-mentioned problem, a method has been devised for controlling current in windings separately for each set. However, according to the above-mentioned current controller for the multiplex winding motor disclosed in Japanese Patent Laid-Open No. 5-260792, the above method causes torque ripple due to interference, which results from unbalance of current phases between windings, so that current control cannot be performed with fast response.

Here, the following will specifically discuss why current control with fast response cannot be obtained due to interference resulting from unbalance of current phases between windings.

For example, as shown in FIG. 1, a set of three-phase windings Ua, Va, and Wa (hereinafter, denoted as subscript 'a'), which are connected at a neutral point Na, and another set of three-phase windings Ub, Vb, and Wb (hereinafter, denoted as subscript 'b'), which are connected at a neutral point Nb, are stored in a stator of the motor without electrical connection. The two sets of windings are not electrically connected but the motor is magnetically connected via a magnetic circuit. The above state is similar to connection of a primary side and a secondary side of a transformer.

Therefore, equivalent circuits of Ua phase and Ub phase, which are arranged in parallel, are configured as FIG. 2. In FIG. 2, reference character $V_u$ denotes terminal voltages from the neutral points, reference character R denotes resistances, reference character ve denotes induction voltages, reference numeral 1 denotes leakage inductance, and reference character M denotes mutual inductance. Further, reference character n denotes a turns ratio of a transformer. Additionally, it should be noted that among these values, particularly values of l and M are different from values used for typical motor control but are equal to values between multiplex two phases arranged in parallel. Moreover, generally in a multiplex winding motor, windings in parallel are equal in winding number, so that n=1 is determined. Besides, at this moment, an equivalent circuit of Va phase and Vb phase and an equivalent circuit of Wa phase and Wb phase are identical to FIG. 2. Thus, when three phases have similar characteristics, even when coordinate conversion is performed on two phases of a rotor dq axis from three phases UVW, an equivalent circuit on the two phases of the dq axis is identical to the equivalent circuit of FIG. 2.

As described above, the plurality of sets of windings is magnetically connected in the multiplex winding motor, so that interference voltage mutually occurs. When the equivalent circuit of the multiplex winding motor having three phases UVW is subjected to coordinate conversion on the two phases of the rotor d-q axis, each of the phases has the circuit configuration of FIG. 2 as discussed above. FIG. 3 is a block diagram showing the equivalent circuit on the d axis. In FIG. 3, $v_{da}$ and $v_{db}$ respectively denote d axis voltages of the sets a and b of windings and $I_{da}$ and $I_{ab}$ respectively denote d axis currents of the sets a and b of windings. Further, in FIG. 3, voltages denoted as $v_{da}$ and $v_{db}$ indicate interference voltages from the other sets of windings. Here, reference character s in FIG. 3 denotes a differential operator of Laplace transform. FIG. 3 shows the equivalent circuit on a rotator d axis. As described in the above explanation, the equivalent circuit on a rotor q axis has the same configuration.

Generally, in vector control of alternating motors, current is controlled separately on rotor dq axes. In a multiplex winding motor, the above-mentioned interference voltage interacts and acts on a current control system as disturbance. As shown in FIG. 3, the interference voltage increases proportionately with a differential value of winding current, so that the interference voltage increases as current is responded faster. Thus, it is not possible to improve the response of the current control system as compared with current control of the conventional single-winding motor. Moreover, a ripple component appears on current for the above reason, resulting in torque ripple.

SUMMARY OF THE INVENTION

The present invention is devised to solve the above-mentioned problem and has as its object the provision of a controller for a multiplex winding motor whereby when a single multiplex winding motor is driven and controlled by a plurality of inverters, while each winding is composed of a current control system, interference can be compensated between current control systems of windings.

The controller for the multiplex winding motor having two sets of windings according to the present invention comprises first current control means for controlling current in a first winding of the multiplex winding motor according to a current command value, a first current detector for detecting current flowing in the first winding, first voltage applying means for applying a voltage to the first winding according to a voltage command value outputted from the first current control means, second current control means for controlling current in a second winding of the multiplex winding motor, a second current detector for detecting current flowing in the second winding, and second voltage applying means for applying a voltage to the second winding according to a voltage command value outputted from the second current control means. The first current control means comprises a first current controller for computing a voltage command value based on a current command value and a current detection value from the first current detector, and the second current control means comprises a second current controller for computing a voltage command value based on a current command value and a current detection value from the second current detector. Further, the first current control means comprises a first voltage non-interacting arithmetic section for compensating for a voltage command value from the first current controller by using a voltage command value from the second current controller, and the second current control means comprises a second voltage non-interacting arithmetic section for compensating for a voltage command value from the second current controller by using a voltage command value from the first current controller.

With this configuration, it is possible to compensate for voltage interference between the current controllers, thereby achieving current control with fast response.

Further, the controller for the multiplex winding motor having three or more sets of windings of the present invention comprises a plurality of current control means for controlling current in a plurality of windings of the multiplex winding motor according to a current command value, a plurality of current detectors for detecting current flowing in the windings, and a plurality of voltage applying means for applying a voltage to the windings according to a voltage command value outputted from the current control means. Each of the current control means comprises a current controller for computing a voltage command value based on a current command value and a current detection value from each of the current detectors, and each of the current control means comprises a voltage non-interacting arithmetic section for compensating for a voltage command value from each of the current controllers by using a voltage command value from a current controller for another current control means.

With this configuration, it is possible to compensate for voltage interference between the current controllers, thereby achieving current control with fast response.

Moreover, in the controller for the multiplex winding motor of the present invention, computation of a voltage command in the voltage non-interacting arithmetic sections is accomplished based on a transfer function of an interference voltage generated in the multiplex winding motor.

Moreover, in the controller for the multiplex winding motor of the present invention, computation of a voltage command in the voltage non-interacting arithmetic sections is accomplished by summing voltage commands of the current controllers, the commands being multiplied by coefficients.

DETAILED DESCRIPTION OF THE PREFERRED EMBODIMENTS

Hereinafter, embodiments of the present invention will be discussed in accordance with the accompanied drawings.
Embodiment 1

Figure 1:
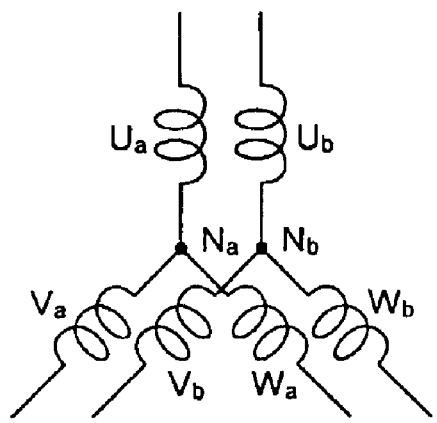
FIG. 1 is a layout drawing showing a plurality of sets of three-phase windings connected at a neutral point.
Figure 2:
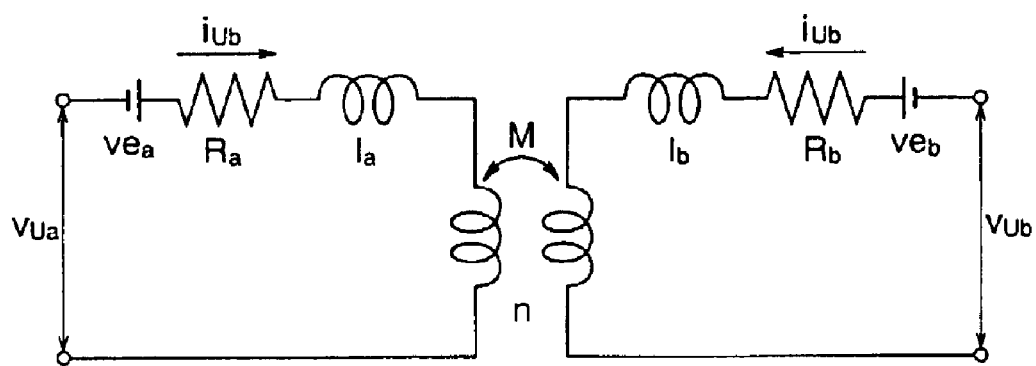
FIG. 2 is a diagram showing equivalent circuits of FIG. 1.
Figure 3:
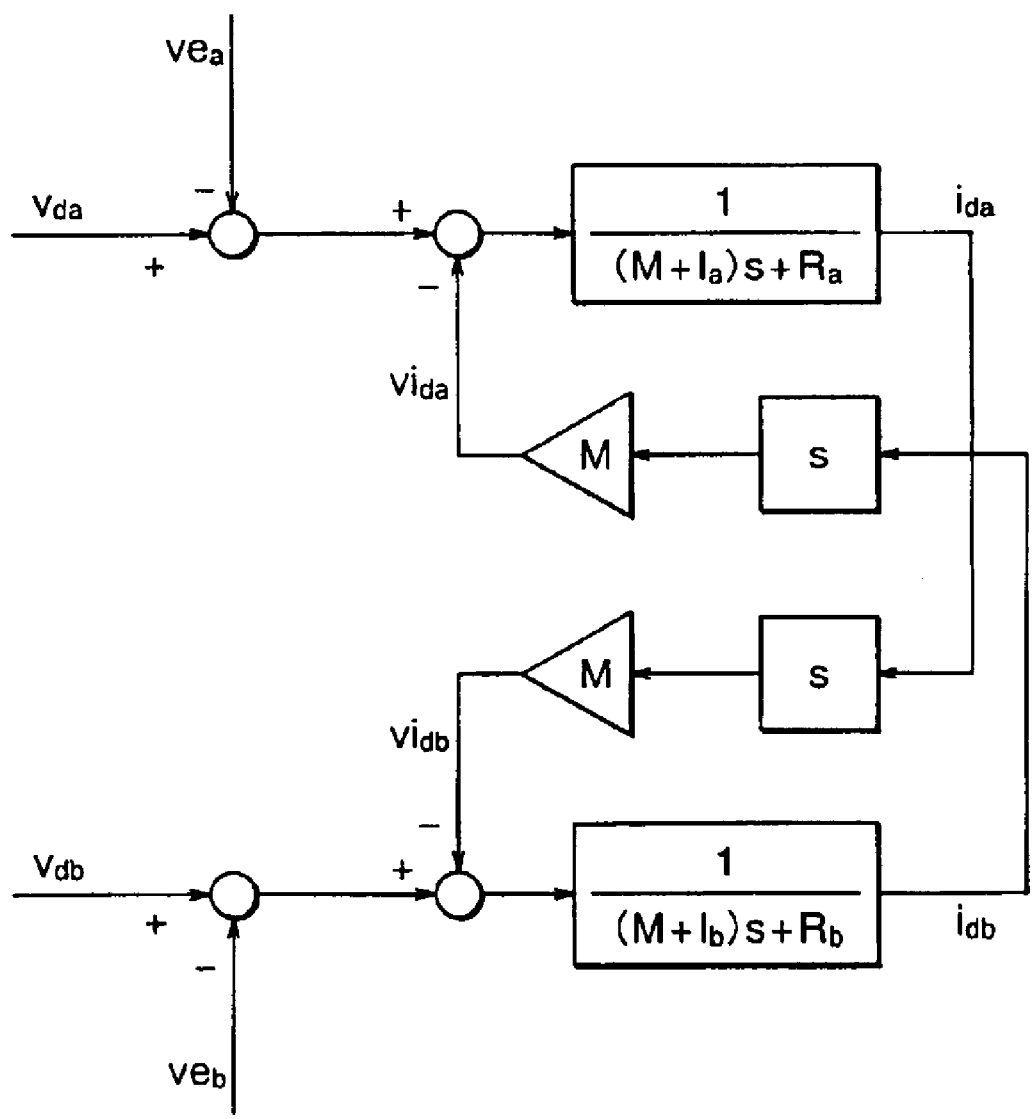
FIG. 3 is a diagram showing an equivalent circuit on a rotor d axis of a multiplex winding motor.

As described in FIG. 3, in a multiplex winding motor, interference voltages $vi_{da}$ and $vi_{db}$ interact and act as disturbances on current control systems. As shown in FIG. 3, it is understood that interference voltages $vi_{da}$ and $vi_{db}$, which are generated by winding voltages $v_{da}$ and $v_{db}$ from winding sets a and b, are expressed by the following transfer function formula (1).

$$\begin{cases} vi_{da} = \dfrac{Ms}{(M+I_b)s+R_b} \cdot V_{db} \\ vi_{db} = \dfrac{Ms}{(M+I_a)s+R_a} \cdot V_{da} \end{cases} \quad (1)$$

In order to suppress interference between the voltage control systems, the interference voltage of formula (1) is computed to compensate a voltage command.

Figure 4:
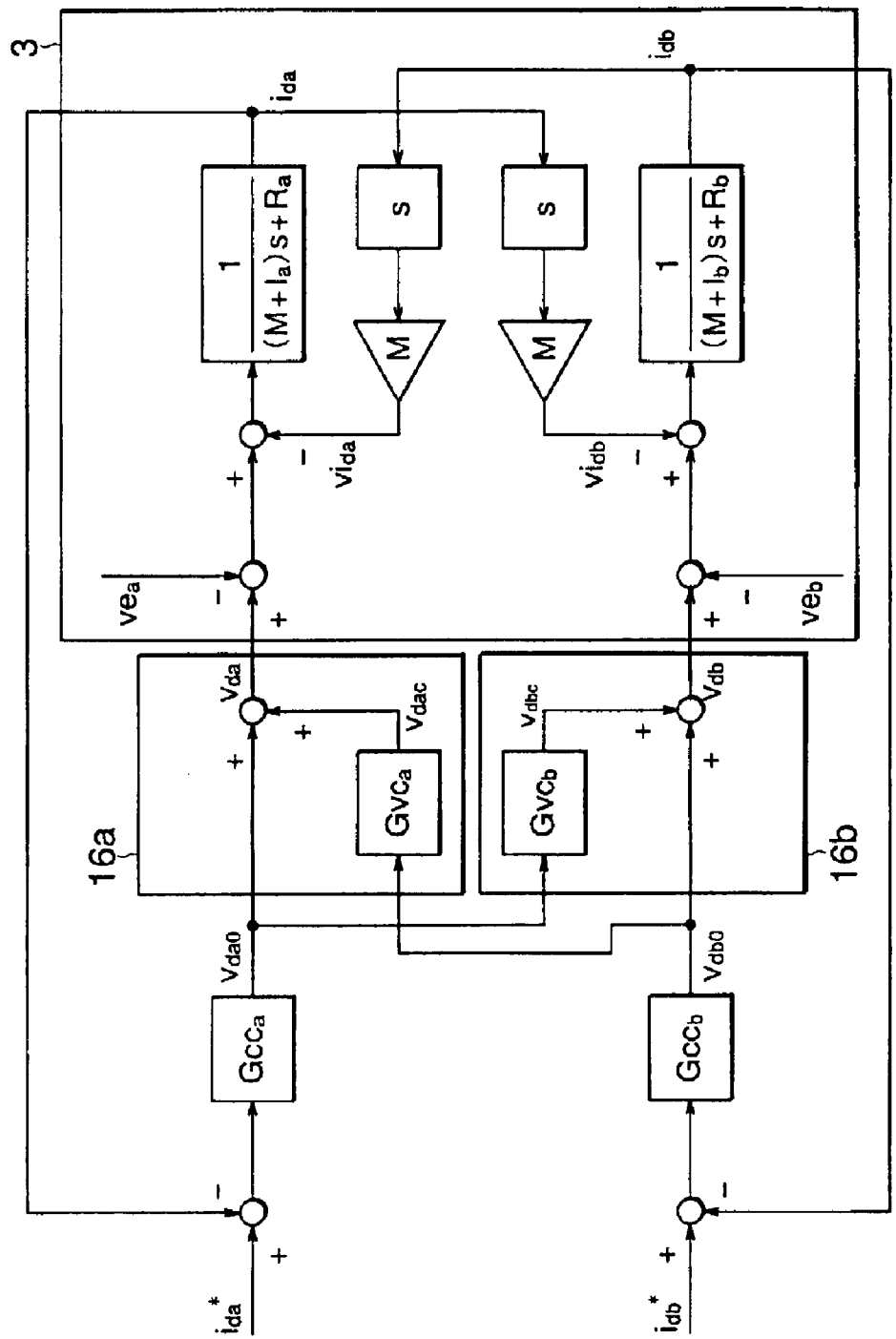
FIG. 4 is a diagram for explaining a method for controlling a controller for a multiplex winding motor according to Embodiment 1 of the present invention.

FIG. 4 is a diagram for explaining a method for controlling a controller for the multiplex winding motor according to Embodiment 1 for carrying out the present invention. FIG. 4 is a block diagram, in which the configuration of a current control system is added to an equivalent circuit on the rotor d axis of the multiplex winding motor of FIG. 3.

In FIG. 4, reference numeral 3 denotes a block diagram showing an equivalent circuit on a rotor d axis of the multiplex winding motor, and the equivalent circuit is identical to FIG. 3. Reference numerals 16a and 16b denote voltage non-interacting arithmetic sections for correcting voltage commands of winding sets a and b. In FIG. 4, reference characters $Gcc_a$ and $Gcc_b$ respectively denote transfer functions of current controllers of the winding sets a and b. The transfer functions operate on voltage command values $v_{da0}$ and $v_{db0}$ to conform current command values $i_{da}*$ and $i_{db}*$ to current detection values $i_{da}$ and $i_{db}$. Reference characters $Gvc_a$ and $Gvc_b$ denote transfer functions of the voltage non-interacting arithmetic section expressed in formula (1). For example, the following formula (2) is applicable.

$$\begin{cases} G_{vca} = \dfrac{Ms}{(M+I_b)s+R_b} \\ G_{vcb} = \dfrac{Ms}{(M+I_a)s+R_b} \end{cases} \quad (2)$$

Compensating voltages $v_{dac}$ and $v_{dbc}$ are computed based on voltage commands $v_{da0}$ and $v_{db0}$ from the current controllers by using $Gvc_a$ and $Gvc_b$. Non-interactive voltage commands $V_{da}$ and $v_{db}$ can be obtained by adding the compensating voltages $v_{dac}$ and $v_{dbc}$ to the voltage commands $v_{da0}$ and $v_{db0}$. In this manner, in the voltage non-interacting arithmetic sections 16a and 16b, non-interacting voltage commands $v_{da}$ and $v_{db}$ are computed based on the voltage commands $v_{da0}$ and $V_{db0}$ from the current controller.

The following will discuss an embodiment of a controller for a multiplex winding motor that is configured according to the above-mentioned method.

Figure 5:
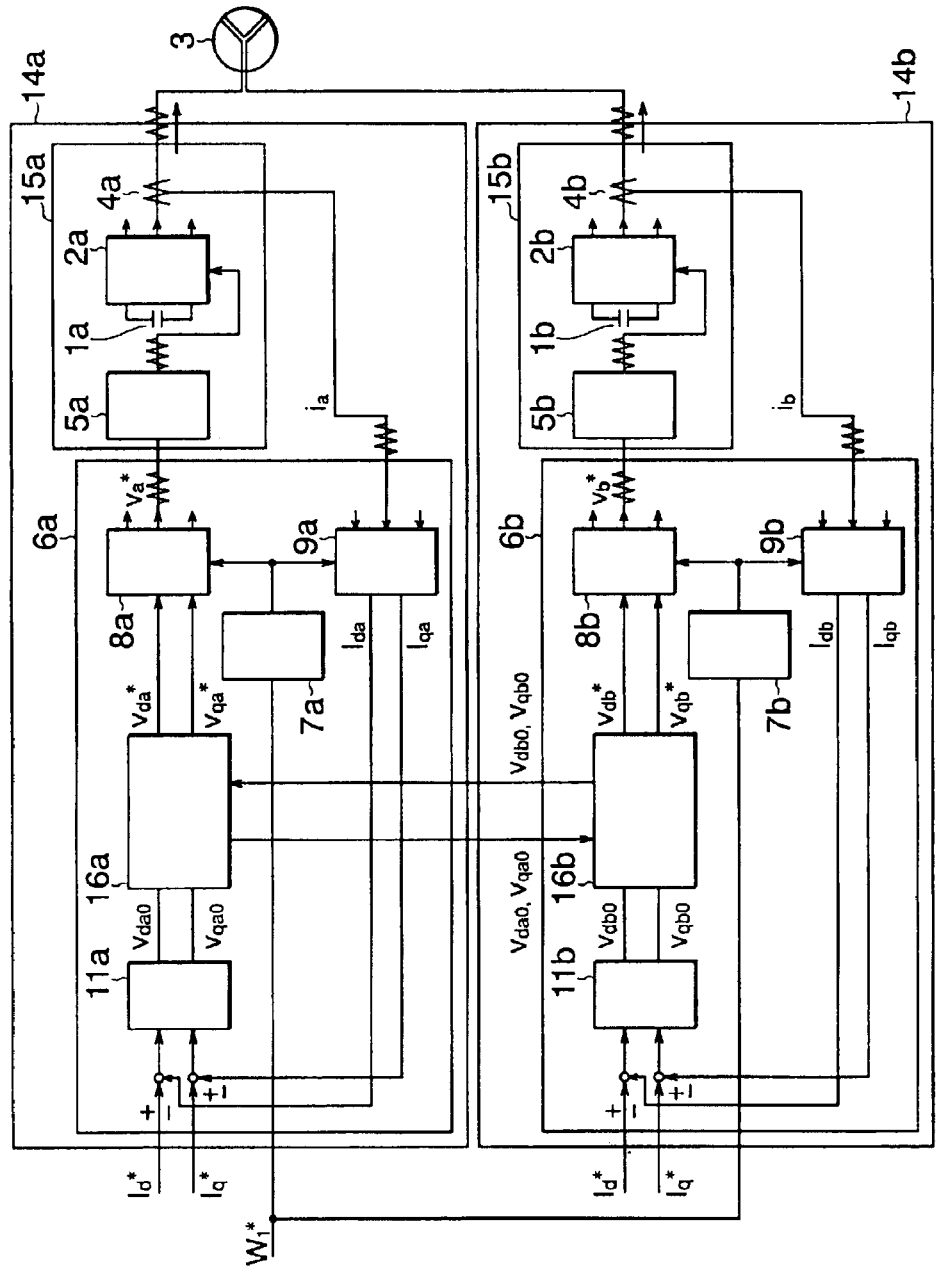
FIG. 5 is a block diagram showing the configuration of the controller for the multiplex winding motor according to Embodiment 1 of the present invention.

FIG. 5 is a diagram showing the configuration of the controller for the multiplex winding motor according to Embodiment 1 of the present invention. In the present embodiment, a multiplex winding motor 3 is composed of windings of two sets a and b. Windings of the set 'a' and windings of the set 'b' are respectively connected to inverters 14a and 14b. Drive circuits 2a and 2b, current detector 4a and 4b, PWM pulse generation circuits 5a and 5b, and power supplies 1a and 1b have the same functions as FIG. 6.

Current control means 6a and 6b are respectively constituted by two-phase sine wave generation circuits 7a and 7b, which use a primary frequency command for an induction motor as input, use a rotor speed of $\omega1*$ for a synchronous motor as input, and output a two-phase sine wave reference (phase) signal, voltage command coordinate converters 8a and 8b for performing coordinate conversion from d-q axis component voltage commands $V_{da}*$, $V_{qa}*$, $V_{db}*$, and $V_{qb}*$ of a rotating coordinate system to three-phase alternating voltage command signals $v_a*$ and $v_b*$ of a stator coordinate system, current component detecting coordinate converters 9a and 9b for performing coordinate conversion from winding alternating currents $i_a$ and $i_b$ to d-q axis component currents $I_{da}$, $I_{qa}$, $I_{db}$, and $I_{qb}$, and voltage non-interacting arithmetic sections 16a and 16b for computing voltage commands $V_{da}*$, $V_{qa}*$, $V_{db}*$, and $V_{qb}*$, which are made non-interacting according to the above-mentioned arithmetic method, based on voltage commands $v_{da0}$ and $v_{qa0}$ from a current controller 11a and voltage commands $v_{db0}$ and $v_{qb0}$ from a current controller 11b.

Figure 6:
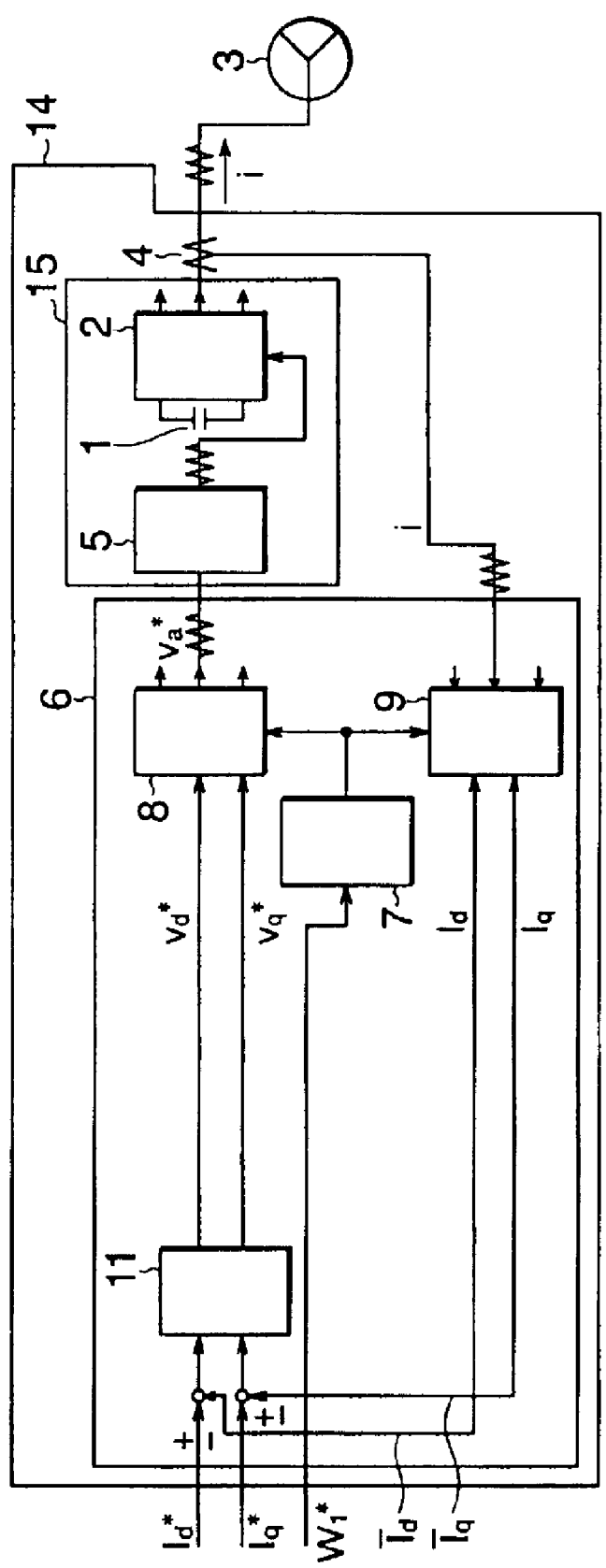
FIG. 6 is a block diagram showing the configuration of a current controller for a typical induction motor.
Figure 7:
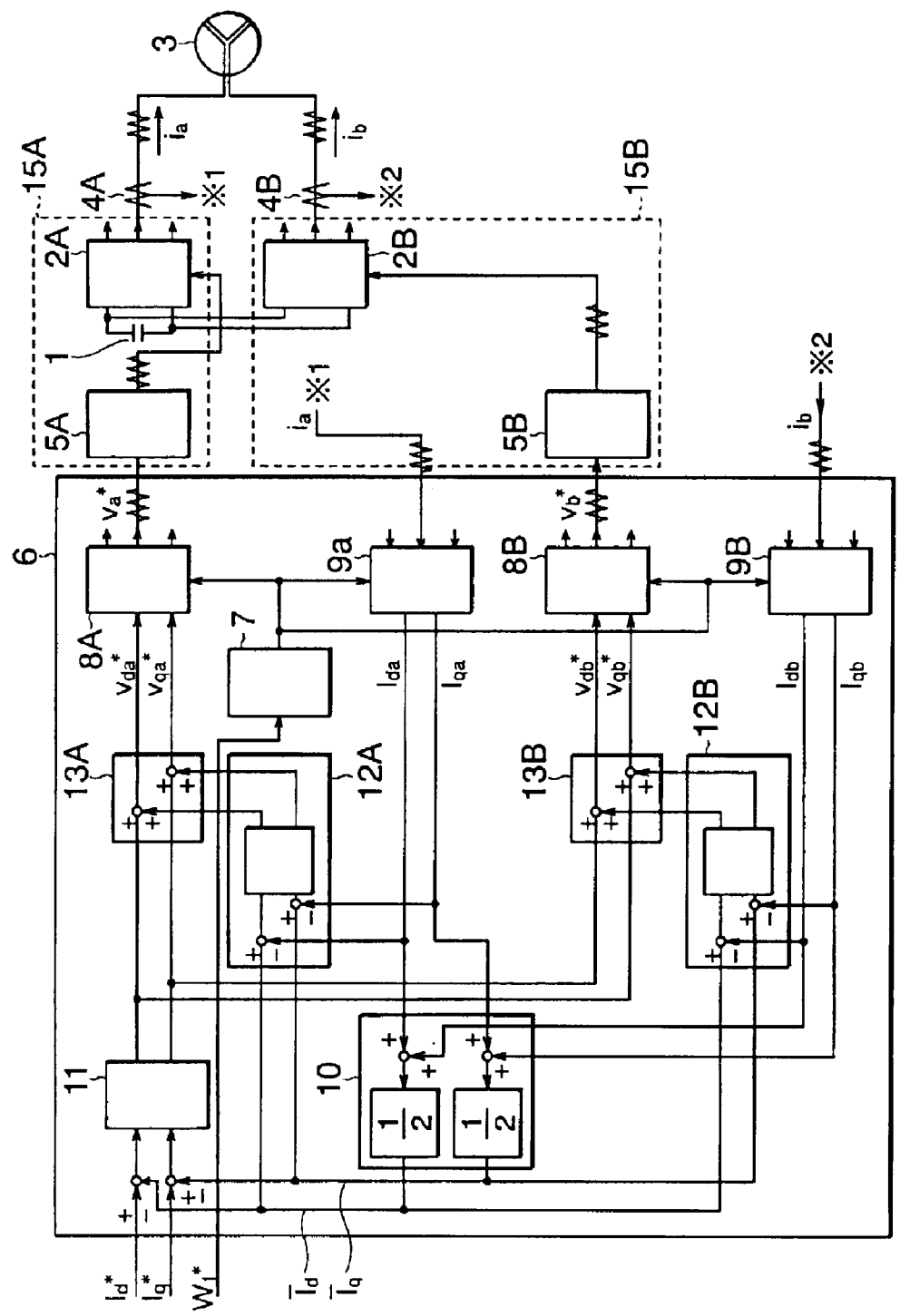
FIG. 7 is a block diagram showing a controller for a conventional multiplex winding motor.

The inverters 14a and 14b are equal to the unit capacity inverter of FIG. 6 in configuration and function except for the existence of the voltage non-interacting arithmetic sections 16a and 16b. As compared with the configuration of the controller for the conventional multiplex winding motor of FIG. 7, it is understood that a unit capacity inverter can be readily combined in the configuration of the controller for the multiplex winding motor according to the present invention of FIG. 5.

Besides, in the non-interacting operation using the above formula (2), it is possible to compensate completely for interference voltages $vi_{da}$, and $vi_{db}$, which are respectively generated by winding voltages $v_{da}$ and $v_{db}$ of the winding sets a and b. Since a low frequency component of an interference voltage can be also reduced by a current controller, the non-interacting operation only on a high frequency component may be sufficiently effective. When an interactive voltage component of a high-frequency component is expressed as a transfer function, the differential operator s is large in the Laplace transform. Thus, in this case, the formula (2) can be simplified as follows:

$$\begin{cases} G'_{vca} = \dfrac{M}{M + l_b} \\ G'_{vcb} = \dfrac{M}{M + l_a} \end{cases} \quad (3)$$

As expressed in formula (3), unlike formula (2), $Gvc_a'$ and $Gvc_b'$ are just coefficients not having a differential operator s. The above-mentioned simplification can reduce arithmetic complexity of the voltage non-interacting arithmetic sections 16a and 16b.

In this manner, in the present embodiment, the voltage non-interacting arithmetic sections are provided for computing a voltage command value, which is supplied to voltage applying means connected to a set of windings, not only by using an output value of current control means for controlling current in the windings but also using an output value of current control means for controlling current in another winding. Hence, it is possible to compensate for voltage interference between current controllers, thereby achieving current control with fast response.

Further, voltage commands of a voltage non-interacting arithmetic sections are computed by using transfer function characteristics of an interference voltage that are shown in FIG. 3. Thus, interference voltage can be completely compensated.

Moreover, computation of a voltage command of the voltage non-interacting arithmetic sections is accomplished by summing outputs of the current control means, the outputs being multiplied by coefficients. Hence, it is possible to reduce arithmetic amounts of the voltage non-interacting arithmetic sections.

Besides, according to the invention, computation of a voltage command in the voltage non-interacting arithmetic sections is accomplished based on a transfer function of an interference voltage generated in the multiplex winding motor. Thus, an interference voltage can be completely compensated.

Furthermore, according to the invention, computation of a voltage command in the voltage non-interacting arithmetic section is accomplished by summing voltage commands of the current control means, the voltage commands being multiplied by coefficients. Hence, it is possible to reduce arithmetic complexity the voltage non-interacting arithmetic sections.

What is claimed is:

1. A controller for a multiplex winding motor having two sets of windings, the controller comprising:

first current control means for controlling current in a first winding of a multiplex winding motor according to a current command value, a first current detector for detecting current flowing in the first winding, first voltage applying means for applying a voltage to the first winding according to a voltage command value output by said first current control means, second current control means for controlling current in a second winding of the multiplex winding motor according to the current command value, a second current detector for detecting current flowing in the second winding, and second voltage applying means for applying a voltage to the second winding according to a voltage command value output by said second current control means, wherein said first current control means comprises a first current controller for computing the voltage command value output by said first current control means, based on the current command value and current detected by said first current detector, said second current control means comprises a second current controller for computing the voltage command value output by said second current control means, based on the current command value and current detected by said second current detector, said first current control means comprises a first voltage non-interacting arithmetic section compensating for a disturbance of the voltage command value output by said first current controller by providing a compensating voltage calculated from the voltage command value output by said second current controller, and said second current control means comprises a second voltage non-interacting arithmetic section compensating for a disturbance of the voltage command value output by said second current controller by providing a compensating voltage calculated from the voltage command value output by said first current controller.

2. A controller for a multiplex winding motor having at least three sets of windings, the controller comprising:

a plurality of current control means for respectively controlling currents in respective windings of a plurality of windings of a multiplex winding motor according to a current command value, a plurality of current detectors for detecting respective currents flowing in the respective windings, and a plurality of voltage applying means for applying respective voltages to the respective windings according to respective voltage command values output by said plurality of current control means, wherein each of said current control means comprises a respective current controller for computing a respective voltage command value based on a corresponding current command value and respective currents detected by each of said current detectors, and each of said current control means comprises a voltage non-interacting arithmetic section compensating for disturbances of respective voltage command values output by each of said current controllers by providing compensating voltages calculated from voltage command values output from said current controllers for the others of said current control means.

3. The controller for the multiplex winding motor according to claim 1, wherein the compensating voltages are computed in said voltage non-interacting arithmetic sections by applying a transfer function of an interference voltage generated in the multiplex winding motor.

4. The controller for the multiplex winding motor according to claim 2, wherein the compensating voltages are computed in said voltage non-interacting arithmetic sections by applying a transfer function of an interference voltage generated in multiplex winding motor.

5. The controller for the multiplex winding motor according to claim 1, wherein the compensating voltages are computed in said voltage non-interacting arithmetic sections by multiplying the voltage command values output by said current controllers by coefficients.

6. The controller for the multiplex winding motor according to claim 2, wherein compensating voltages are computed in said voltage non-interacting arithmetic sections by multiplying the voltage command values output by said current controllers by coefficients.

* * * * *